Sept. 11, 1945.    C. KOEHLER    2,384,685
QUACK GRASS DIGGING APPARATUS
Filed June 6, 1941    2 Sheets-Sheet 1
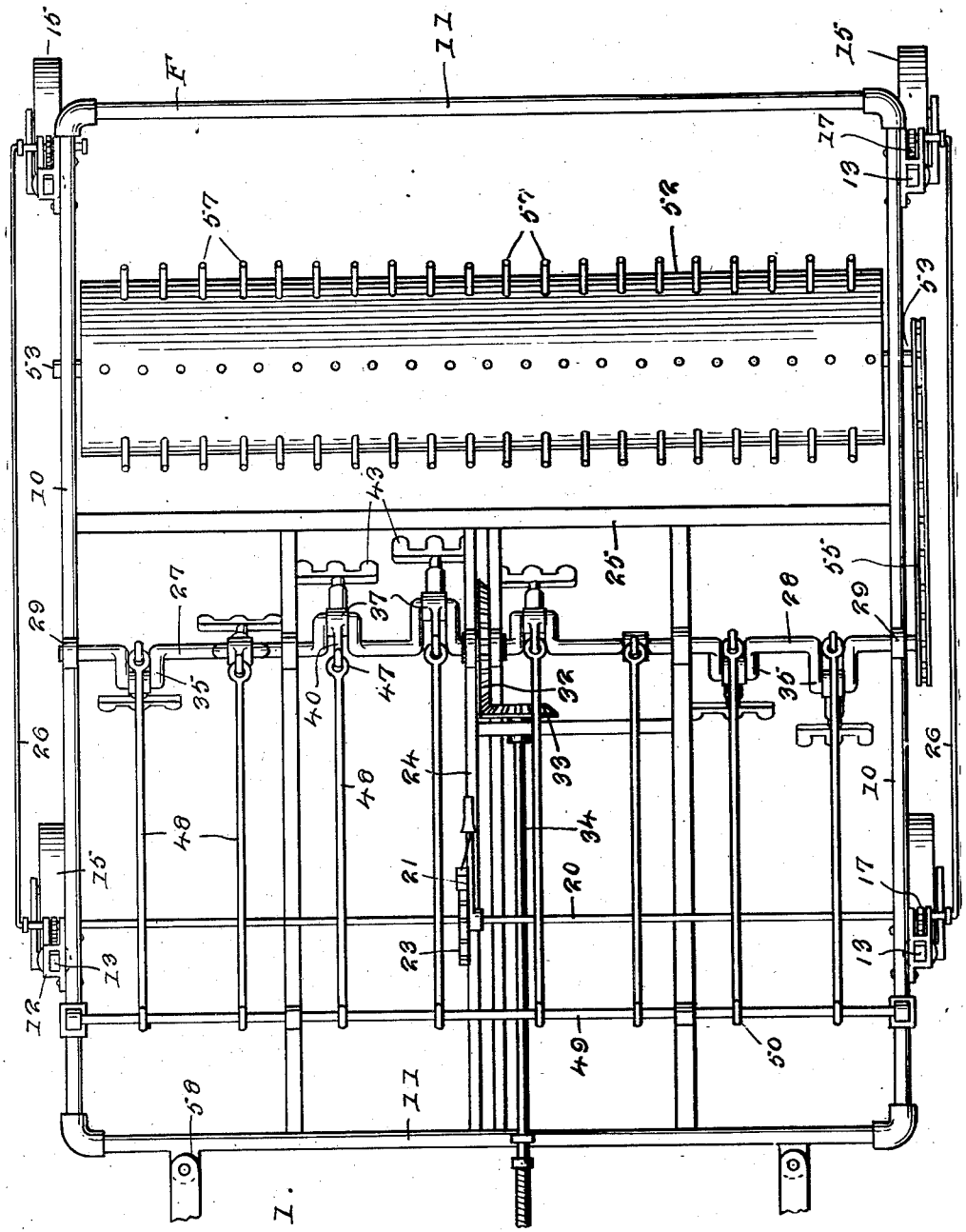
Conrad Koehler
INVENTOR Sept. 11, 1945.   C. KOEHLER   2,384,685
QUACK GRASS DIGGING APPARATUS
Filed June 6, 1941   2 Sheets-Sheet 2
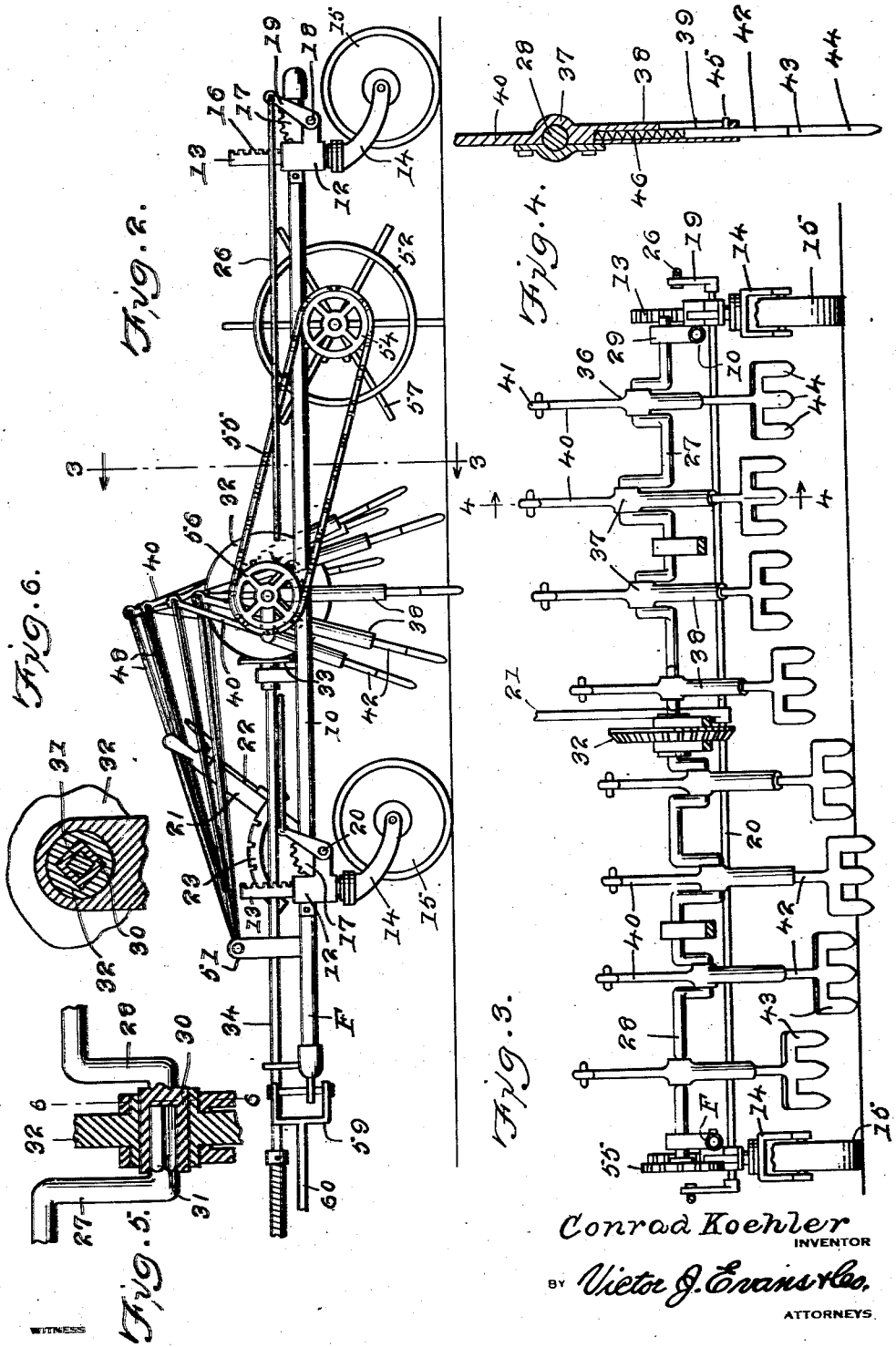
Conrad Koehler
INVENTOR
BY Victor J. Evans & Co.
ATTORNEYS Patented Sept. 11, 1945

2,384,685

UNITED STATES PATENT OFFICE 2,384,685

QUACK GRASS DIGGING APPARATUS

Conrad Koehler, Erskine, Minn.

Application June 6, 1941, Serial No. 396,934

1 Claim. (Cl. 97—36)

The present invention relates to apparatus for digging quack grass and like weedy growth.

An object of the invention is to provide a quack grass digging apparatus of generally improved design.

Another object of the invention is the provision of quack grass digging apparatus which will effectively uproot the plants for destruction thereof.

A further object of the invention is the provision of digging apparatus of the above character which is efficient and reliable in operation.

Other objects and advantages of the invention will become apparent as the description progresses.

In the accompanying drawings forming a part of this specification and in which like numerals are employed to designate corresponding parts throughout:

Figure 1 is a top plan view of the apparatus,

Figure 2 is a side elevational view of the same,

Figure 3 is a transverse section taken on line 3—3 of Figure 2,

Figure 4 is an enlarged section taken on line 4—4 of Figure 3,

Figure 5 is an enlarged fragmentary section through the crank shaft coupling, and Figure 6 is a section taken on line 6—6 of Figure 5.

Referring in detail to the drawings, wherein for the purpose of illustration is shown a preferred example of the invention, F generally designates the main frame structure of the apparatus, embodying an elongated rectangular-shaped frame assembly formed of tubular side bars 10 and end bars 11. Rigidly fastened to the side bars 10 adjacent the ends are four brackets 12 shaped to receive through vertical guides thereof the upstanding bar sections 13 of wheel mounting casters having arcuate caster yokes 14 pivotally connected to the bars 13 and carrying ground wheels 15. Each of the bars 13 is formed along one longitudinal edge with rack forming teeth 16 arranged to mesh with the teeth of a segment 17. The rear brackets 12 are formed with horizontal extensions in which are journaled stub shafts 18 on the inner portions of which are secured the segments 17 and on the outer portions of which are fastened radial levers 19. The forward brackets 12 support a transversely extending rotary shaft 20 having the segments 17 and arms 19 fastened on its ends. To the medial portion of the shaft 20 is fastened an operating lever 21 carrying ratchet mechanism 22 cooperative with the notches of a ratchet segment 23 secured on a longitudinally extending bar 24 extending from the front end of the frame to a transverse bar 25 secured at the intermediate portion of the frame. A rigid rod 26 mounted at each side of the frame has its ends pivotally connected with the arms 19 so that the four segments 17 may be simultaneously actuated for elevation or lowering of the rigid frame F with relation to the carrier wheels.

On the medial portion of the frame F is mounted a transversely extending crank shaft assembly composed of a pair of complementary aligned crank shaft sections 27 and 28 having their outer ends journaled in bearings 29 on the frame. The inner end of the section 28 is formed with a square socket 30 which receives therein a square shaft portion 31 of the complementary section. On the socket is securely fitted a hub portion of a beveled gear 32 disposed to mesh with a beveled pinion 33 secured on the inner end of a drive shaft 34 designed to project forwardly of the frame for connection with a source of motive power, such as the power take-off of a tractor. These shaft sections 27 and 28 are formed at longitudinally spaced intervals with radial double cranks 35 arranged at varying angular positions about the assembly.

On each of the cranks 35 is fitted a supporting member 36 formed with an intermediate bearing portion 37 designed for detachable mounting on the pin of the crank. Projecting downwardly from the bearing 37 is an elongated sleeve portion 38 formed at one side with a longitudinal slot 39. Projecting upwardly from the bearing portion 37 is a bar 40 formed at the outer end with an eye 41. Within the sleeve 38 of each support member 36 is slidably fitted a shank 42 of a fork-shaped spading member 43, in the example shown having three spaced tines 44 which taper to points at the outer ends. A pin 45 secured to each shank 42 projects through the slot 39 of the sleeve 38 to limit the longitudinal sliding movement of the spading member with reference to its support. A compression spring 46 fitted in the sleeve 38 functions to yieldingly force the spading element to projected position, as best shown at Figure 4. To each eye 41 is connected an eye 47 formed on the outer end of a rigid link-forming rod 48. The opposite ends of the series of links connecting with the fork members are rockably connected with a transversely extending shaft 49, as by loops 50. The ends of the shaft 49 are rigidly supported on upstanding brackets 51 secured to the side parts 10 of the main frame. The link elements 48 coact with the spade members in such manner that as the cranks revolve the forks in a vertical plane to alternately thrust the tines to a predetermined depth in the ground and elevate the same thereabove a lateral thrust action is imparted to the forks so that the tines uproot a top layer of the soil together with plant growth therein and impel or throw the uprooted matter such as the growth together with soil clinging thereto rearwardly of the digger mechanism against or into the path of a beater.

On the rear portion of the frame F is journaled a transversely mounted cylindrical drum 52 extending approximately the full width of the frame and formed at the ends with stub shafts 53 journaled in bearings on the frame. One of these stub shafts has a sprocket wheel 54 fixed thereon over which is trained an endless drive chain 55. The chain 55 is also trained over a complementary sprocket wheel 56 secured on one projecting end of the crank shaft assembly. The drum 52 is constructed to provide thereon a plurality of radial elements which project from the circumference to form longitudinal rows of spikes 57 normally disposed so that the outer extremities just or nearly make contact with the normal level of the ground surface on which the apparatus is moved.

At the front of the frame, adjacent each side thereof, are provided forwardly projecting apertured lugs 58 designed for detachable connection with the yoked end portions 59 of a pair of draft hitch bars 60 for connecting the apparatus with a tractor or other draft means.

When the digger apparatus is drawn along the ground for the purpose of digging up quack grass or like plant growth, the crank shaft is rotated to revolve at a speed relatively high compared to the motion of the implement or the speed of its carrier wheels 15. Such action causes the spading members to dig into the ground in successive order so as to uproot the quack grass and adhering soil and throw the same rearwardly of the spaders. Thereafter the spikes 57 of the drum 52, which also revolves at a relatively high speed, beat the uprooted matter by striking or kicking the elevated weeds rearwardly so as to shake the same to loosen and separate soil therefrom. The weeds may thereafter be gathered by a rake or similar gathering implement if so desired or may be left to be killed by the sun. It is advantageous that the digging apparatus be joined to a tractor in order to furnish power for rotating the crank shaft and, through the medium of the sprockets 54 and 56 and the chain 55, the drum 52. The elevation of the frame F above the ground may be selectively adjusted to regulate the depth of the digging operation and the relative arrangement of the drum spikes by manipulating the lever 21 to rock the segments 17 and thereby elevate or lower the frame with reference to the rack bars 13 of the wheel casters which have a swivel connection with these bars. Should a fork strike a hard unyielding object, such as a rock, the compression spring 46 will allow retraction thereof in its holder sleeve to cushion the shock and strain occasioned thereby and also reduced the likelihood of injuring the tines.

As will be apparent from the foregoing, my apparatus provides an efficiently operable implement for uprooting quack grass and depositing the same on the surface of the ground and subjecting the same to beater action to shake the soil therefrom. This apparatus is capable of comparatively rapid motion so that a large area of land may be treated in a relatively short period of time.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:

In a digging apparatus of the character described, comprising a rectangular frame, a transverse shaft mounted on said frame having a plurality of cranks thereon, a spade supporting member having a rotary connection intermediate its ends with each crank, a stationary rod mounted on the frame above and forward of the crank shaft, a link connecting the upper end of each spade supporting member with said rod, means for rotating said crank shaft, two vertically movable wheels carried by the frame in front of the crank shaft, two vertically movable wheels carried by the frame in rear of the crank shaft, racks carried by the vertical bars supporting the wheels, a transverse shaft on the frame above each pair of wheels, gears carried by the shaft and meshing with the racks of all four wheel supports, and a lever forward of the crank shaft having link connections for simultaneously oscillating said shafts, whereby each wheel can be simultaneously raised and lowered the same distance.

CONRAD KOEHLER.